June 22, 1965   J. RIJNDERS ETAL   3,191,019
VEHICLE ILLUMINATING SYSTEM
Filed Dec. 13, 1962   2 Sheets-Sheet 1

INVENTOR
JOHANNES RIJNDERS
CHARLES H. J. ANDERSON
BY
Frank R. Trifari
AGENT

June 22, 1965    J. RIJNDERS ETAL    3,191,019
VEHICLE ILLUMINATING SYSTEM
Filed Dec. 13, 1962    2 Sheets-Sheet 2

INVENTOR
JOHANNES RIJNDERS
CHARLES H.J. ANDERSON
BY
AGENT

United States Patent Office 3,191,019
Patented June 22, 1965

3,191,019
VEHICLE ILLUMINATING SYSTEM
Johannes Rijnders and Charles Henri Joseph Anderson, Emmasingel, Eindhoven, Netherlands, assignors to North American Philips Company, Inc., New York, N.Y., a corporation of Delaware
Filed Dec. 13, 1962, Ser. No. 244,460
Claims priority, application Netherlands, Dec. 29, 1961, 273,092
6 Claims. (Cl. 240—8.3)

Road traffic on dark highways suffers from a limitation in that large vehicles, such as vans, buses and the like, can be hardly distinguished by passing traffic, notwithstanding the use of the prescribed tail lights. This may jeopardize road safety, especially in the case of passing. In a great many countries it is not permitted to indicate the contours of the rear side of such a vehicle, for example, by small red lights.

The present invention has for its object to provide a solution for this problem. In general, this problem consists in illuminating one of the walls of such a vehicle by simple expedients so that it is clearly visible in the dark. The invention relates to a system to be provided on a vehicle of the said kind for illuminating one of the walls, in particular the rear wall, of such a vehicle with light passing along this wall. Such a system comprises a light source of interrupted or continuous configuration to be provided on the vehicle and preferably mounted on a support, which light source is screened from direct observation on the side remote from the wall to be illuminated. Each of various parts of this light source, which are shifted with respect to each other in the longitudinal direction of the source, coact with individual optical concentrating means, while at least on one side of the light source screens are arranged so that the concentrating means associated with a particular part of the light source are only struck by light emitted by the corresponding part of this source.

The action of the screens provided in the system largely counteracts the lateral radiation of the parts of the light source. Thus it may be ensured that at least on the road-center side of the free transverse profile of a vehicle the rear side of which is equipped with such a system, substantially no light from the system strikes the road surface. If this should be the case, the driver of the vehicle in question would observe, when looking in his rear-view mirror, a large spot of light on the road beside his car, which spot might give the impression that another car is passing the vehicle.

In a favourable embodiment of the system in accordance with the invention, the concentrating means consist of a series of lenses arranged adjacent each other which are spaced apart from the corresponding part of the light source approximately by the focal distance, while in the space between the light source and the lenses provision is made of opaque screens extending transversely to the longitudinal direction of the light source.

In a further embodiment of the system in accordance with the invention, at least the greater part of these screens are inclined in the same direction, if desired at different angles to the longitudinal direction of the light source. Thus it is prevented in particular that light from the light source is directed to the center of the road, while the system may nevertheless extend substantially throughout the width of the wall to be lighted.

Although as a source of light use may be made of a plurality of substantially point sources arranged adjacent each other, such as, for example, incandescent lamps, according to the invention the light source preferably consists of one or a few elongated low-pressure mercury vapour discharge tubes, since they have a more economical energy consumption. As concentrating optical means, use may also be made of reflectors the ends of which more remote from the light source may at the same time serve as screens.

A further embodiment of the system in accordance with the invention is characterized in that it comprises an elongated housing to be secured to or near the wall to be lighted by means of a few supports, the side of the housing more remote from the wall to be lighted is opaque, one wall, preferably the upper wall, of this housing being detachable and the lenses being arranged in the lower wall, while in this housing the lampholders, the screens and, if desired, also the ballast units for the light source or sources are mounted on a frame.

In order that the invention may be readily carried into effect, it will now be described more fully with reference to the accompanying drawing, in which.

Figures 1, 2:
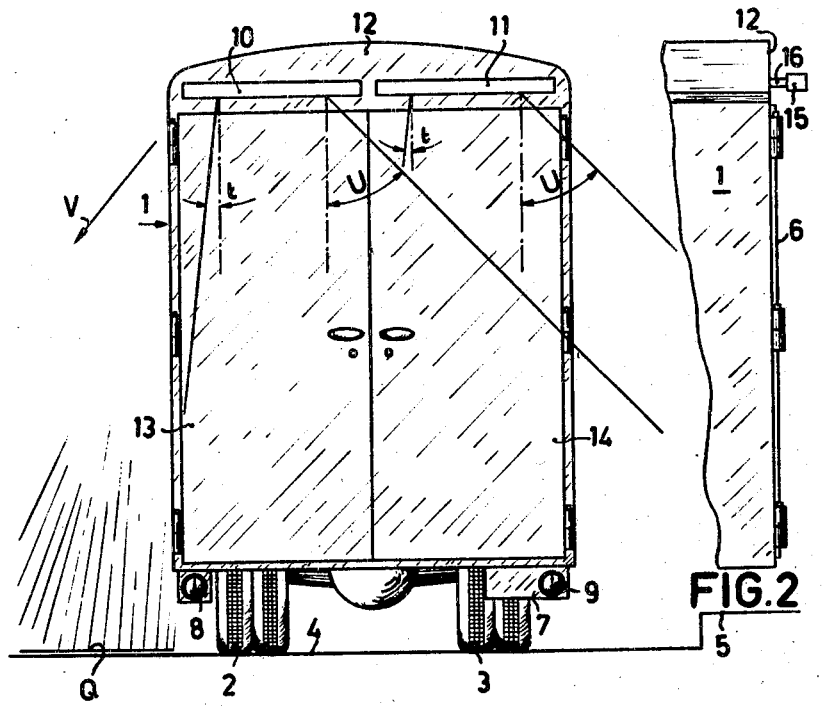
FIG. 1 is a diagrammatical rear view of a van provided with the lighting system in accordance with the invention.
FIG. 2 is a side view of this van.

A part of the loading space of the van shown in FIGS. 1 and 2 is designated by 1. The sets of wheels of the van are denoted by 2 and 3. The road surface is designated by the reference numeral 4. The drawing is based on right-hand rule traffic, so that the van is located near the right-hand sidewalk 5. The rear side of the van is denoted by the reference numeral 6. On this side, provision is made in the usual manner of a license plate 7 and two combined stop and tail lights 8 and 9.

If such a van drives in the dark on an unlighted road and no light strikes the rear wall 6, this wall is hardly visible. The invention has for its object to provide means with which efficacious illumination of this rear wall by light passing along it can be obtained in a simple manner and with a low consumption of energy.

To this end, two lighting systems 10 and 11 of a construction shown in greater detail in FIGS. 3 to 7 are provided above two loading doors 13 and 14 on a fixed upper part 12 of the rear wall 6. As is shown in FIG. 2, only a narrow housing 15 held by supports 16 projects beyond the rear wall 6 of the van.

In FIGS. 3 to 7, this housing 15 and the supports 16 are also indicated. The housing 15 has a prismatic configuration and is closed on the side more remote from the van by an opaque vertical wall 17. The inner part of the housing 15 is accessible by means of a detachable cover 18 which is secured to the housing 15 by means of the securing bolts 19.

The system shown in FIGS. 3 to 7 has a length L which is of the order of magnitude of the width of each of the doors 13 and 14. In this system, provision is made of two aligned low-pressure mercury vapour discharge tubes, of which only one is shown (20) in FIGS. 3, 4, 6 and 7. Each of these discharge tubes is fixed in two lampholders 21 and 22. These holders are supported by a frame 23. This frame is constituted by a strip bent in the shape of a U and is secured by means of bolts 24 to a supporting member 25 of insulating material. The supporting member 25 is then fixed by means of a bolt 26 at the rear side of the housing 15. The frame 23 further supports the ballast units 27.

Figure 3:
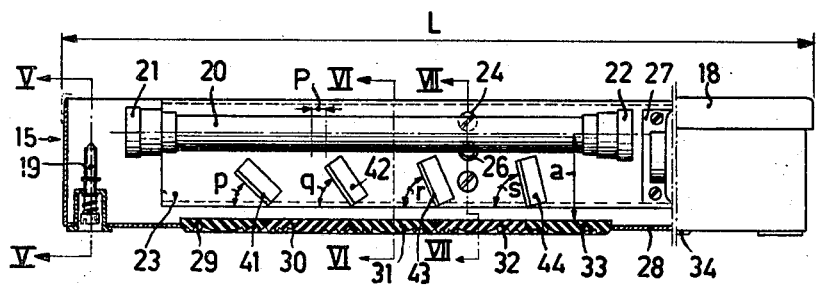
FIG. 3 shows an embodiment of one of the systems of FIG. 1 with the rear wall partly removed.
Figure 4:
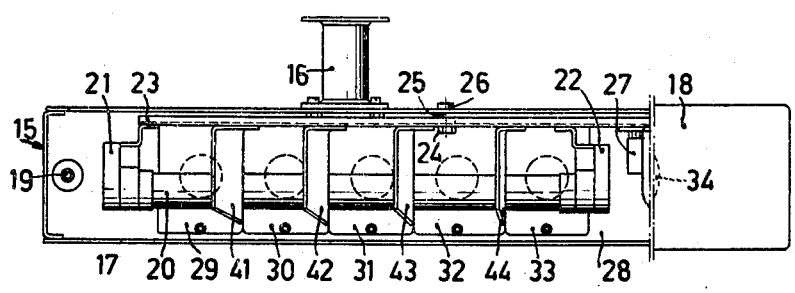
FIG. 4 is a plan view of the same system with the cover partly removed.
Figure 5:
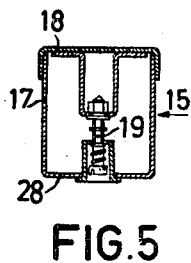
FIGS. 5, 6 and 7 are cross-sectional views of the system in the direction of the arrows V—V, VI—VI and VII—VII.
Figure 6:
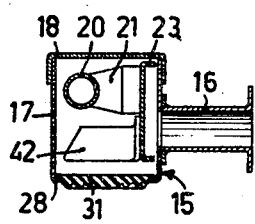
Figure 7:
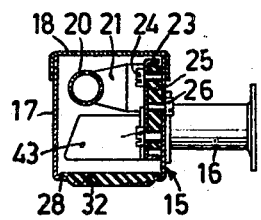

As is apparent from FIGS. 3, 6 and 7, the lower wall 28 of the housing 15 accommodates a plurality of lenses 29, 30, 31, 32, 33 and 34. These rotation-symmetrical lenses are of the Fresnel-type.

If the system should not be provided with the screens to be described hereinafter, in principle each of the lenses could co-operate with each part of the linear light source. For example, if the lens 29, which is spaced apart from the axis of the discharge tube 20 by approximately its focal distance $a$, should receive light from the zone P of the discharge tube 20, it could also direct this light in directions which are designated by $v$ in FIG. 3. Light leaving the system in these directions would give rise to the formation of a light spot Q (only part indicated) on the road surface 4. This light spot is located beside the van on the side of the oncoming traffic. The same undesirable effect could occur as a result of the co-operation of other parts of the discharge tube with lenses located further to the left with respect to these parts.

This drawback is counteracted by the provision of the screens 41, 42, 43 and 44 which are secured to the frame 23, for example, by means of spot-welding. All these screens are inclined in the same direction at different angles $p$, $q$, $r$ and $s$ to the longitudinal axis of the discharge tube 20. The lower sides of all these screens project slightly from the contact surface of two adjacent lenses. It will be evident that this results in a strong screening action with respect to the light emitted to the left. This is clearly apparent from FIG. 1, which illustrates that to the left-hand side light can emanate from the system 10 only at a small angle $t$ to the vertical. To the right-hand side the light can emanate from the system at a considerably larger angle ($u$) to the vertical. This is due to the fact that, as a result of the provision of the screens, certain parts of the light source can only co-operate with particular lenses and consequently cannot co-operate with adjacent lenses.

What is claimed is:

1. An illuminating system for the rear wall of a truck, bus or similar vehicle comprising at least one elongated light source, said light source having individual light units, means for mounting said light source adjacent to the top of said vehicle, individual screening means for said light units which direct the light rays emanating from said individual light units away from direct observation from the left side of the vehicle looking at said rear wall thereof, said screening means being at different angles relative to the longitudinal axis of said light source, each of said light units having corresponding individual optical concentrating means, said individual screening means being so arranged that each of said optical concentrating means associated with the adjacent light unit have only the light rays of said adjacent light unit impinge thereon.

2. An illuminating system for the rear wall of a truck, bus or similar vehicle as claimed in claim 1 wherein said optical concentrating means is a series of lenses arranged adjacent to each other and spaced apart from the longitudinal axis of said light source by approximately their focal distance, and in the spaces between said lenses and said light source are located said screening means which comprise opaque screens extending substantially transversely to the longitudinal axis of said light source.

3. An illuminataing system for the rear wall of a truck, bus or similar vehicle as claimed in claim 2 wherein a majority of said opaque screens are inclined in the same direction.

4. An illuminating system for the rear wall of a truck, bus or similar vehicle as claimed in claim 1 wherein said elongated light source is a low pressure mercury vapor discharge tube.

5. An illuminating system for the rear wall of a truck, bus or similar vehicle comprising at least one elongated light source, an elongated housing for said light source, said light source having individual light units, a plurality of supports for securing said housing to the rear wall at a location adjacent to the top of said vehicle, the side of said housing remote from said wall to be illuminated being opaque, one of said other sides of said housing being detachable therefrom thereby permitting access to the interior of said housing, individual screening means for said light units which direct the light rays emanating from said individual light units away from direct observation from the left side of the vehicle looking at said rear wall thereof, said screening means being at different angles relative to the longitudinal axis of said light source, each of said light units having corresponding individual optical concentrating means, said individual screening means being so arranged that each of said optical concentrating means associated with the adjacent light unit have only the light rays of said adjacent light unit impinge thereon.

6. An illuminating system for the rear wall of a truck, bus or similar vehicle as claimed in claim 5 wherein said screening means coacts with said light source so that at least on one side of said vehicle substantially no light rays from said light source strikes the road surfaces.

References Cited by the Examiner

UNITED STATES PATENTS

| | | | |
|---|---|---|---|
| 2,192,019 | 2/40 | Schepmoes | 240—7.35 |
| 2,214,447 | 9/40 | Bave | 240—7.1 |
| 2,461,446 | 2/49 | Schepmoes | 240—7.1 |
| 2,617,013 | 11/52 | Smyth | 240—11.4 |

NORTON ANSHER, *Primary Examiner.*